(12) United States Patent
Gabusi et al.

(10) Patent No.: US 10,815,112 B2
(45) Date of Patent: Oct. 27, 2020

(54) DEVICE AND METHOD FOR TRANSFERRING CONTAINERS

(71) Applicant: I.M.A. INDUSTRIA MACCHINE AUTOMATICHE S.P.A., Ozzano dell'Emilia (IT)

(72) Inventors: Gabriele Gabusi, Castenaso (IT); Claudio Trebbi, Medicina (IT)

(73) Assignee: I.M.A. Industria Macchine Automatiche S.p.A. (IT)

( * ) Notice: Subject to any disclaimer, the term of this patent is extended or adjusted under 35 U.S.C. 154(b) by 404 days.

(21) Appl. No.: 15/568,242

(22) PCT Filed: Apr. 18, 2016

(86) PCT No.: PCT/IB2016/052205
§ 371 (c)(1),
(2) Date: Oct. 20, 2017

(87) PCT Pub. No.: WO2016/170465
PCT Pub. Date: Oct. 27, 2016

(65) Prior Publication Data
US 2018/0148309 A1    May 31, 2018

(30) Foreign Application Priority Data
Apr. 21, 2015    (IT) .............................. MI2015A0573

(51) Int. Cl.
*B65G 47/90*    (2006.01)
*B67C 7/00*    (2006.01)
(Continued)

(52) U.S. Cl.
CPC ............ *B67C 7/0026* (2013.01); *B65G 47/52* (2013.01); *B65G 47/82* (2013.01); *B65G 47/90* (2013.01);
(Continued)

(58) Field of Classification Search
CPC .. B65B 5/00; B65B 5/06; B65B 23/14; B65G 47/90; B65G 47/907
(Continued)

(56) References Cited

U.S. PATENT DOCUMENTS 2,262,799 A    11/1941    Everett
3,363,394 A    1/1968    Rainbow
(Continued)

FOREIGN PATENT DOCUMENTS

EP    0496083 A1    7/1992
JP    2001010717 A    1/2001
(Continued)

*Primary Examiner* — Gloria R Weeks
(74) *Attorney, Agent, or Firm* — Laubscher & Laubscher, P.C.

(57) ABSTRACT

A transferring device is provided for transferring containers from a container advancing device, where they are aligned in at least one row along an advancing direction, to at least one operating unit arranged outside the line, adjacent to the container advancing device, along a transferring direction transverse to the advancing direction. The transferring device includes at least two transferring arms, movable to selectively translate along the transferring direction from the container advancing device toward the operating unit.

11 Claims, 5 Drawing Sheets

(51) Int. Cl.
  *G01G 15/00* (2006.01)
  *B65G 47/52* (2006.01)
  *B65G 47/82* (2006.01)
  *B67C 3/02* (2006.01)

(52) U.S. Cl.
  CPC ............... *B67C 3/02* (2013.01); *G01G 15/00* (2013.01); *G01G 15/006* (2013.01); *B65G 2201/0244* (2013.01); *B65G 2207/08* (2013.01); *B67C 2007/006* (2013.01)

(58) Field of Classification Search
  USPC .......................................... 53/473, 475, 531
  See application file for complete search history.

(56) References Cited

U.S. PATENT DOCUMENTS

| | | | |
|---|---|---|---|
| 5,092,414 A | 3/1992 | Blezard | |
| 5,256,029 A * | 10/1993 | Fluck | B65B 23/14 414/792.9 |
| 6,374,984 B1 * | 4/2002 | Nagler | B07C 5/361 177/1 |
| 7,856,797 B2 * | 12/2010 | Black | B65B 5/061 53/147 |
| 8,015,778 B2 * | 9/2011 | Tischhauser | B65B 5/105 53/475 |
| 8,689,530 B2 * | 4/2014 | Prahm | B65B 5/061 53/247 |
| 8,777,552 B2 * | 7/2014 | Ward | B25J 15/0052 414/623 |
| 8,931,240 B2 * | 1/2015 | Lindee | B65B 35/58 53/391 |
| 9,038,354 B2 * | 5/2015 | Davi | B65B 5/105 53/142 |
| 9,409,724 B2 * | 8/2016 | Hammacher | B65B 23/14 |
| 2001/0049923 A1 * | 12/2001 | Huppi | B65B 5/105 53/473 |
| 2005/0166552 A1 * | 8/2005 | Omo | B65B 25/146 53/443 |
| 2008/0131253 A1 * | 6/2008 | Scott | B66C 3/20 414/729 |
| 2009/0012644 A1 * | 1/2009 | Stifter | B65B 5/12 700/216 |
| 2010/0101191 A1 * | 4/2010 | Lindee | B65G 47/256 53/471 |
| 2014/0290180 A1 * | 10/2014 | Olbrich | B65B 19/28 53/411 |
| 2015/0158611 A1 * | 6/2015 | Kalany | B65B 35/26 53/443 |
| 2015/0191261 A1 * | 7/2015 | Clark | B65B 35/32 53/443 |

FOREIGN PATENT DOCUMENTS

| | | |
|---|---|---|
| WO | 0168451 A1 | 9/2001 |
| WO | 20100127936 A1 | 11/2010 |

* cited by examiner

DEVICE AND METHOD FOR TRANSFERRING CONTAINERS

CROSS-REFERENCE TO EARLIER APPLICATION

This application is a § 371 National Stage Entry of PCT/IB2016/052205 filed Apr. 18, 2016 entitled "Device and Method for Transferring Containers." PCT/IB2016/052205 claims priority of IT-MI2005A000573 filed Apr. 21, 2015. The entire content of these applications are incorporated herein by reference in their entireties.

BACKGROUND OF THE INVENTION

Embodiments described herein relate to a device and method for transferring containers having various shapes, for example vials, ampoules, bottles, capsules, containing various substances in the inside thereof, for example liquids, which are more or less viscous, powders, or granules. Embodiments of the transferring device and method described herein may be applied, for example, to filling lines for filling containers equipped with a container advancing device and with one or more container weighing units in order to transfer the containers from the advancing device to the one or more weighing units, and vice versa.

BRIEF DESCRIPTION OF THE PRIOR ART

It is known to carry out the packaging of pharmaceutical products in liquid or powder form in respective containers, such as for example vials, ampoules, bottles, capsules and alike, by using a suitable filling line, which provides at least one filling station, one weighing station and one container closing station, the stations being positioned one after another along an advancing direction.

In particular, it is known to carry out the weighing of those containers by weighing units located at a device for advancing the containers themselves along the filling line.

The weighing operation is usually carried out outside the line, that is to say, by temporarily transferring the containers to be weighed from the advancing device to the weighing unit, then repositioning the containers in the advancing device once weighing has been concluded, so that they can be advanced along the advancing direction, toward the container closing station.

It is known that the transferring of the containers from the advancing device toward the weighing unit and vice versa is critical to the operation. It is further known that the transferring operation may often be subject to vibrations and/or oscillations which are difficult to dampen electronically and which prevent high transfer speeds, which contrasts the need for increasingly greater output speeds from the filling lines. Moreover, vibrations and/or oscillations may often result in an inaccurate weight measurement or in excessive container waiting times on the weighing stations. Moreover, an imprecise or abrupt transferring action may cause the substance contained in the containers to escape, with the inevitable need of machine downtime in order to intervene and restore the correct functionality.

The effects of an unstable, imprecise or abrupt moving may be particularly visible in containers with base dimensions that are much less than the container height.

Therefore, particular drawbacks may be detected when moving containers with barycenter that makes them unstable if subjected to vibrations and/or oscillations or if they are moved in an uncontrolled or unbalanced way.

Various transferring devices are known that may be of different typology, such as for example arms or platforms, which can provide for rotary, translating type movements, can raise and lower themselves, or even be obtained from combinations of the movements described above. Examples of such devices are disclosed in application Nos. EP-A-0.496.083, WO-A-01/68451 and WO-A-2010/127936.

One drawback of these known transferring modes is due to the fact that the devices provided for implementing them are not adaptable to the cases of so called container "format change". In fact, complete replacement of the transferring device with another one that fits the new size is typically required, thus negatively impacting times, costs and productivity. Attempts have been made to produce "universal" transferring devices, or at least devices that can fit a wide range of sizes. However, those attempts often resulted in devices that are not very precise, with a system for gripping and transferring the containers that is not very reliable, and with the above risks.

Another drawback may be due to the fact that the known devices are often complex and laborious to make, involving the use of a considerable number of components, resulting in higher production costs, as well as risks of faults, need for maintenance and substitution of components, machine downtime and loss in productivity.

Thus there is the need for improving a device and method for transferring containers for a weighing unit, a weighing unit and method which can overcome at least one of the drawbacks of the prior art.

In particular, one object of the invention is to make a transferring device that operates irrespective of the size and dimensions of the containers.

Another object of the present invention is to provide a device that carries out the transfer of the containers quickly, precisely and reliably.

Another object of the present invention is to provide a transferring device and method that is simple and economical.

Yet a further object of the invention is to supply a transferring device and method that moves the above-mentioned containers in a stable way, in compliance with the preceding objects.

Yet another object of the invention is to propose a transferring device and method that enables the containers to be transferred to a weighing unit so as to allow prompt weighing of all of the containers, or even a statistical weighing of the containers themselves.

SUMMARY OF THE INVENTION

According to embodiments, a transferring device for transferring containers from a container advancing device is provided wherein the containers are aligned in at least one row along an advancing direction, to at least one weighing operating unit arranged outside the line, adjacent to the container advancing device, along a transferring direction transverse to the advancing direction. The transferring device includes transferring arms, movable for selectively translating along the transferring direction from the container advancing device toward the operating unit, the transferring arms also being movable for moving toward and away from each other along the transferring direction, for selectively defining a first gripping condition with adjustable format, in which the transferring arms are brought closer to each other and in contact on one side and the other—namely, on opposite sides—with one or more containers arranged along the advancing direction for transferring the containers along the transferring direction, and a second releasing condition, in which the transferring arms are spaced away from each other and from the containers.

According to one embodiment, the transferring device defines between the transferring arms, in the adjustable gripping condition, at least one container gripping zone having a width that is adaptable to be from time to time essentially equal to a larger transverse size of the containers.

According to one embodiment, the transferring device includes two transferring arms cooperating with a single operating unit, both of the two transferring arms having an internal contact surface which grips the containers and having an external surface. The distance between the internal contact surfaces, when they are both in contact with the containers, defines the container gripping zone.

According to another embodiment, the transferring device includes three transferring arms, two of which are external transferring arms and one is an intermediate transferring arm which cooperate with the two operating units arranged on opposite sides with respect to the container advancing device and in which the external transferring arms include internal contact surfaces for gripping the containers and an external surface. The intermediate transferring arm includes two contact surfaces for gripping the containers, the distance between respective and reciprocally facing internal contact surfaces and contact surfaces defining two container gripping zones.

According to another embodiment, the first external transferring arm includes a supporting rod and a gripping edge including one internal contact surface. The second external transferring arm includes a supporting rod and a gripping edge including at least one internal contact surface. The intermediate transferring arm includes a supporting rod and a gripping edge including two contact surfaces.

According to one embodiment, the transferring device includes a control unit for controlling the alignment of one or more containers along the advancing direction, the alignment of one or more containers with at least one operating unit and translation of the one or more containers along a transferring direction by the transferring arms.

According to one embodiment, a weighing station of a filling line for filling pharmaceutical, medical or food containers includes one or more weighing operating units and a transferring device according to embodiments of the present invention.

According to one embodiment, a filling line for filling pharmaceutical, medical or food containers includes a filling station, a weighing station equipped with a transferring device and a container closing station.

According to embodiments, a method is provided for transferring containers from a container advancing device, where they are aligned in at least one row along an advancing direction, to at least one operating unit arranged outside the line, adjacent to the container advancing device, along a transferring direction transverse to the advancing direction, the method also includes:

translating transferring arms that are movable along the transferring direction from the container advancing device toward the operating unit; and
  selectively defining, by moving the transferring arms toward and away from each other along the transferring direction, a gripping condition with adjustable format, in which the transferring arms are brought closer in contact on opposite sides with one or more containers being arranged along the advancing direction for transferring them along the transferring direction, and a releasing condition, in which the transferring arms are spaced away from the containers.

According to embodiments, a computer program is provided which can be stored in a computer-readable medium containing instructions that, once performed by a transferring device cause the transferring method described herein to be performed.

These and other aspects, features and advantages of the present disclosure will be better understood with reference to the following description and to the drawings. The drawings, which are integrated with and form part of the present description, illustrate some embodiments of the present transferring device and, together with the description, intend to describe the principles of the disclosure.

BRIEF DESCRIPTION OF THE FIGURES

These and other features of the present invention will appear clear from the following description of embodiments, given by way of non-limiting example, with reference to the appended drawings, in which.

In order to make understanding easier, identical reference numbers have been used, where possible, to identify identical common elements in the figures. It shall be understood that elements and features of one embodiment may be suitably incorporated in other embodiments without further clarification.

DETAILED DESCRIPTION

Before describing the embodiments, it should be clarified that the present description is not limited, in the application thereof, to the construction and arrangement details of the components, as described in the following description using the appended figures. The present description may provide other embodiments and be made or put into practice in other various ways. Moreover, it should be clarified that the phraseology and terminology used herein is for descriptive purposes and shall not be considered as limiting.

Embodiments described herein relate to a transferring device 10 for transferring containers 16, which are homogeneous to one another in shape and size, from a container advancing device 14, where they are aligned in at least one row along an advancing direction F, to at least one operating unit arranged outside the line, adjacent to the container advancing device 14.

Embodiments of the transferring device 10 according to this description may be used for moving containers 16, for example vials, ampoules or bottles, or any other product with suitable shape and dimensions.

A transferring device 10 for containers 16 of the type adopted in the embodiments described herein may be configured to make many transferring variations, to be understood as sequences of operations carried out in order to cause the containers 16 to cooperate with the operating unit, without thereby departing from the present invention.

One example of an operating unit usable in the embodiments described herein may be a quality control unit, or a generic unit for measuring a physical measurement, for example a container weighing unit, which may perform statistical weighing or 100% weighing. In particular, an operating unit according to the embodiments described herein may be a container weighing unit 12.

A transferring device 10 for containers 16 of the type adopted in the embodiments described herein may, therefore, be configured to serve a weighing unit 12 in a coordinated way.

Embodiments described herein of the transferring device 10 for containers 16 may, for example, be used in an apparatus, or line, for producing pharmaceutical products, including at least one weighing unit 12 and at least one advancing device 14 for containers 16.

Figure 1:
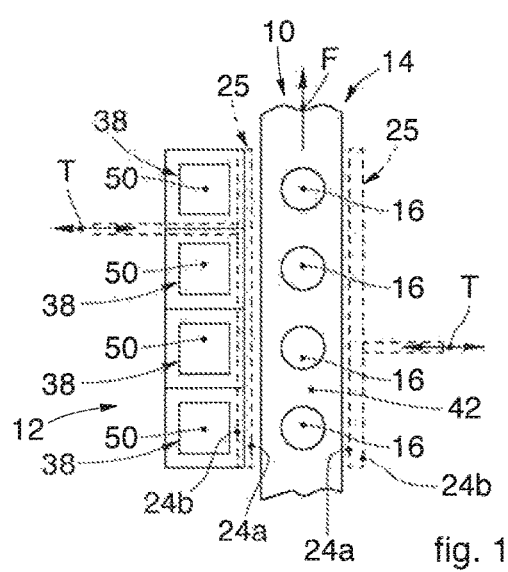
FIG. 1 is a schematic top view of a container transferring device according to embodiments described herein.
Figure 2:
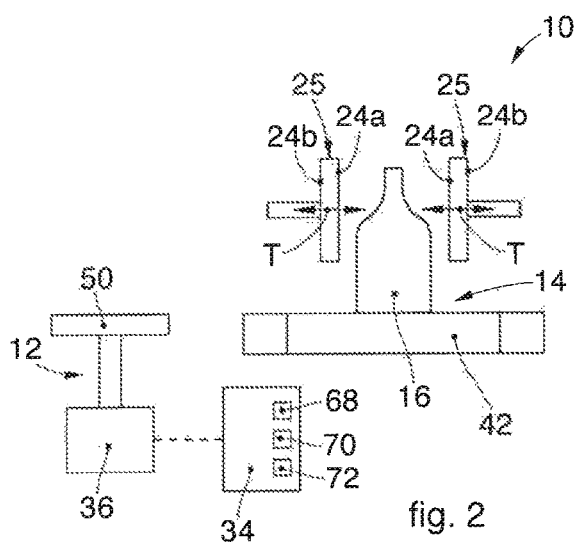
FIG. 2 is a schematic front view of a container transferring device according to embodiments described herein.

The transferring device 10 transfers the above-mentioned containers 16 along a transferring direction T transverse to the above-mentioned advancing direction F and, for that purpose, includes transferring arms 25, for example two transferring arms 25, which are movable for selectively translating along the transferring direction T from the container advancing device 14 toward the above-mentioned operating unit, which, as already indicated, may be a container weighing unit 12 (FIGS. 1 and 2).

The above-mentioned two transferring arms 25 are movable toward and away from each other along the above-mentioned transferring direction T, for selectively defining an adjustable format gripping condition in which the transferring arms 25 are brought closer in contact on opposite sides with one or more containers 16 arranged along the advancing direction F and a releasing condition in which the transferring arms 25 are spaced away from the containers 16.

Figure 3:
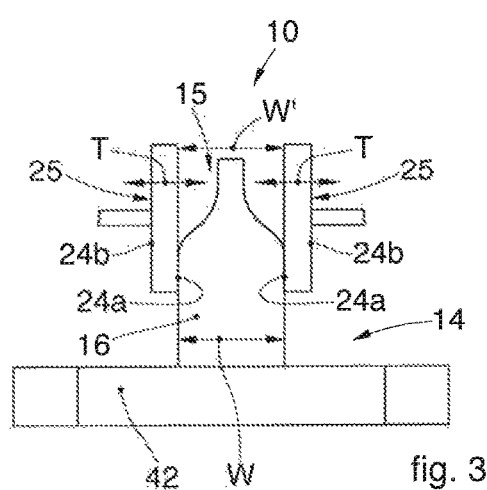
FIG. 3 is a schematic front view of a transferring device according to a first operating condition.
Figure 4:
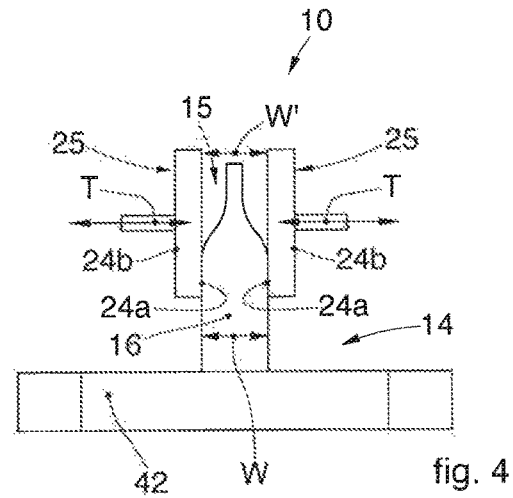
FIG. 4 is a schematic front view of a transferring device according to a second operating condition.

In this way, in the adjustable format gripping condition, it is possible to define between the two transferring arms 25 a container gripping zone 15 with width W' that is adaptable to be from time to time essentially equal to a larger transverse size W of the containers 16 as shown for example in FIGS. 3 and 4. Therefore, in this way the transferring device 10 is adaptable precisely and quickly to the format of the containers 16, enabling a stable, secure and precise conveyance thereof.

The transferring arms 25 are configured to take the mentioned adjustable format gripping condition for picking up the containers 16 from the container advancing device 14, transferring them along the transferring direction T toward the operating unit outside the line and transferring the containers 16 again from the operating unit toward the container advancing device 14. In other words, during transferring of the containers 16 from the container advancing device 14 to the weighing unit 12, and vice versa, the transferring arms 25 are always gripping the containers 16 precisely, thereby avoiding any vibrations, oscillations, falls or other disadvantages. In this manner, the format of the containers 16 may be changed quickly and reliably, by gradually moving the transferring arms 25 so that they laterally abut the containers, defining a container gripping zone 15 suitable for the size of the containers 16.

FIGS. 1 and 2 illustrate embodiments of a transferring device 10 according to the present description which includes two transferring arms 25, in cooperation with a single operating unit, in this case a container weighing unit 12, arranged at the side of the advancing device 14.

The two transferring arms 25 are both provided with an internal contact surface 24a configured to grip the containers 16 and with an external surface 24b. In this way, the distance between the internal contact surfaces 24a, when both are in contact with the containers, defines the container gripping zone 15.

Figure 5:
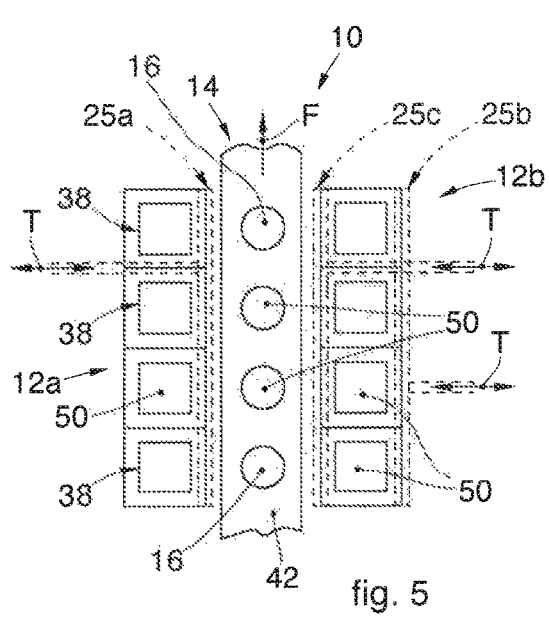
FIG. 5 is a schematic top view of a container transferring device according to further embodiments described herein.
Figure 6:
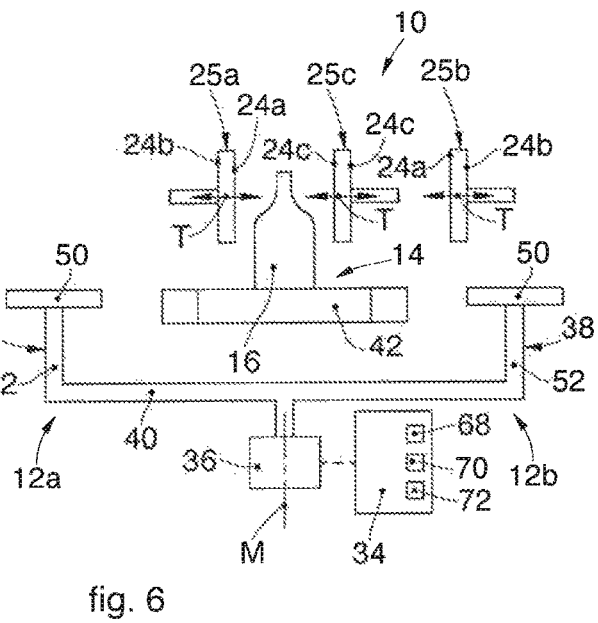
FIG. 6 is a schematic front view of a container transferring device according to further embodiments described herein.

FIGS. 5 and 6 illustrate further embodiments of a transferring device 10 according to the present description which includes three transferring arms 25a, 25b, 25c in cooperation with two operating units, in this case two container weighing units 12a, 12b, arranged on opposite sides with respect to the advancing device 14. Of those three transferring arms 25a, 25b, 25c, two external transferring arms 25a, 25b and one intermediate transferring arm 25c are provided.

The two external transferring arms 25a, 25b are provided with an internal contact surface 24a configured to grip the containers 16 and with an external surface 24b, while the intermediate transferring arm 25c is provided with two contact surfaces 24c configured to grip the containers 16. In this way, the distance between respective and reciprocally facing internal contact surfaces 24a and contact surfaces 24c defines two container gripping zones 15.

Figure 7:
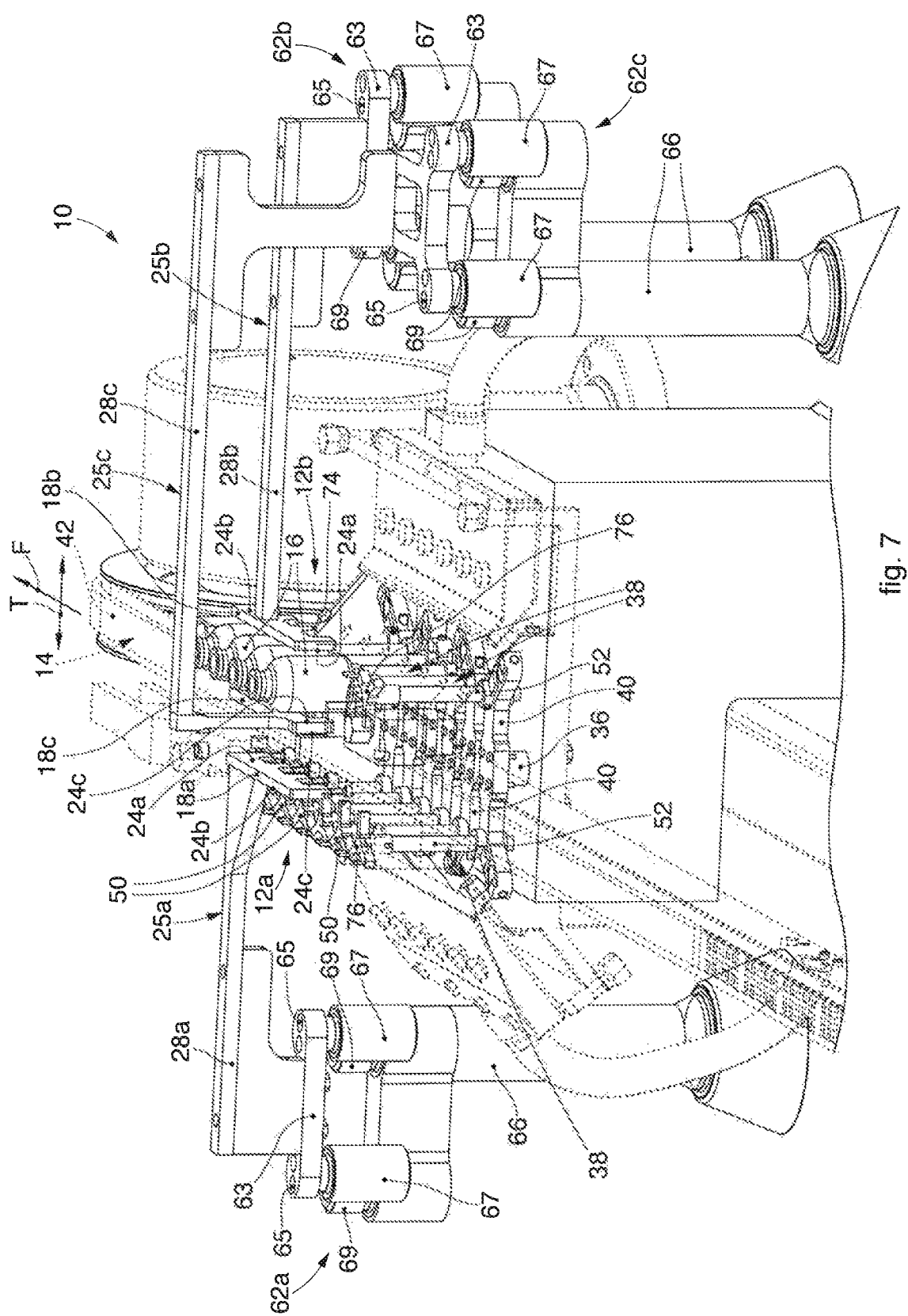
FIG. 7 is a perspective view of a transferring device according to further embodiments described herein.
Figure 8:
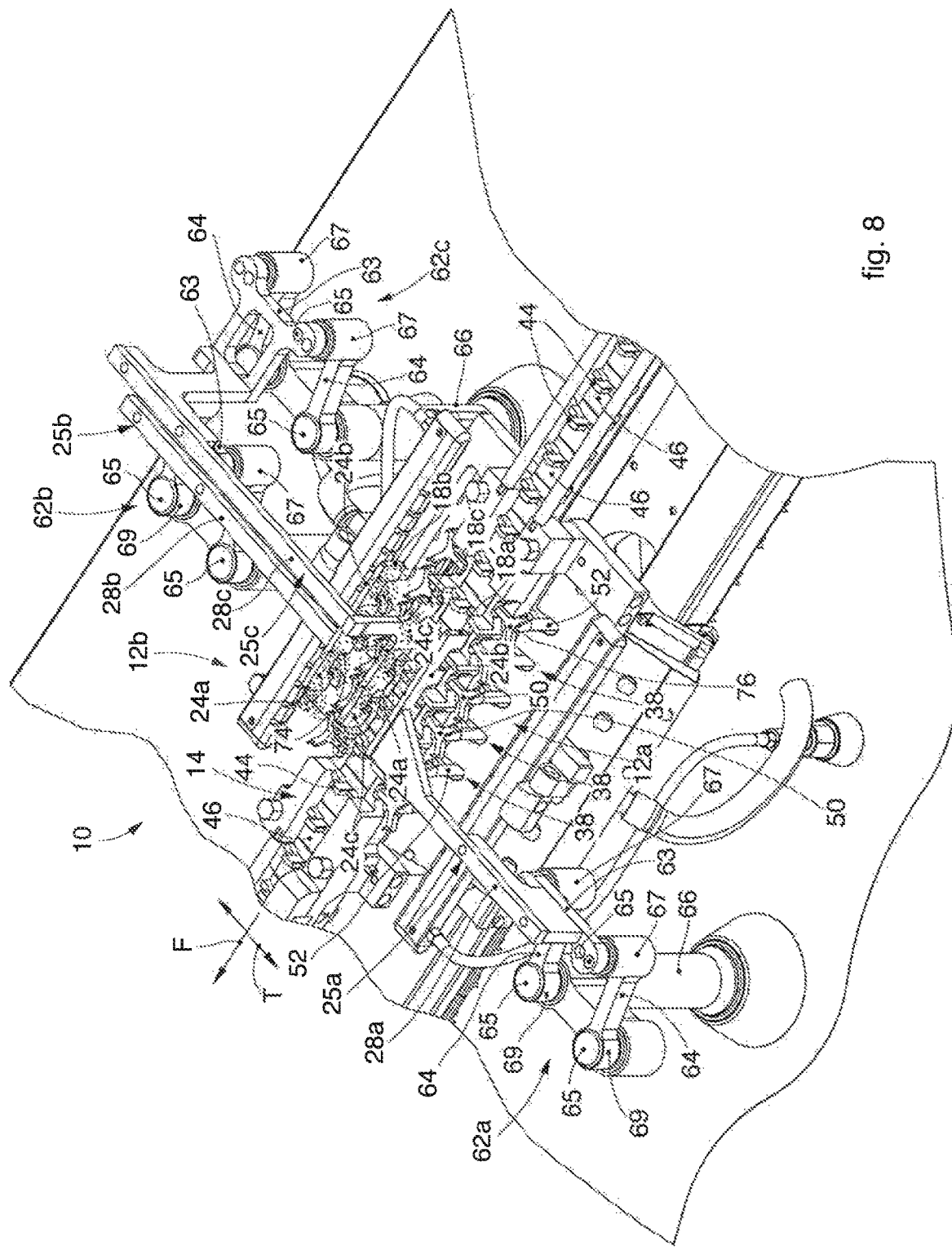
FIG. 8 is a perspective view of a transferring device according to further embodiments described herein.
Figure 9:
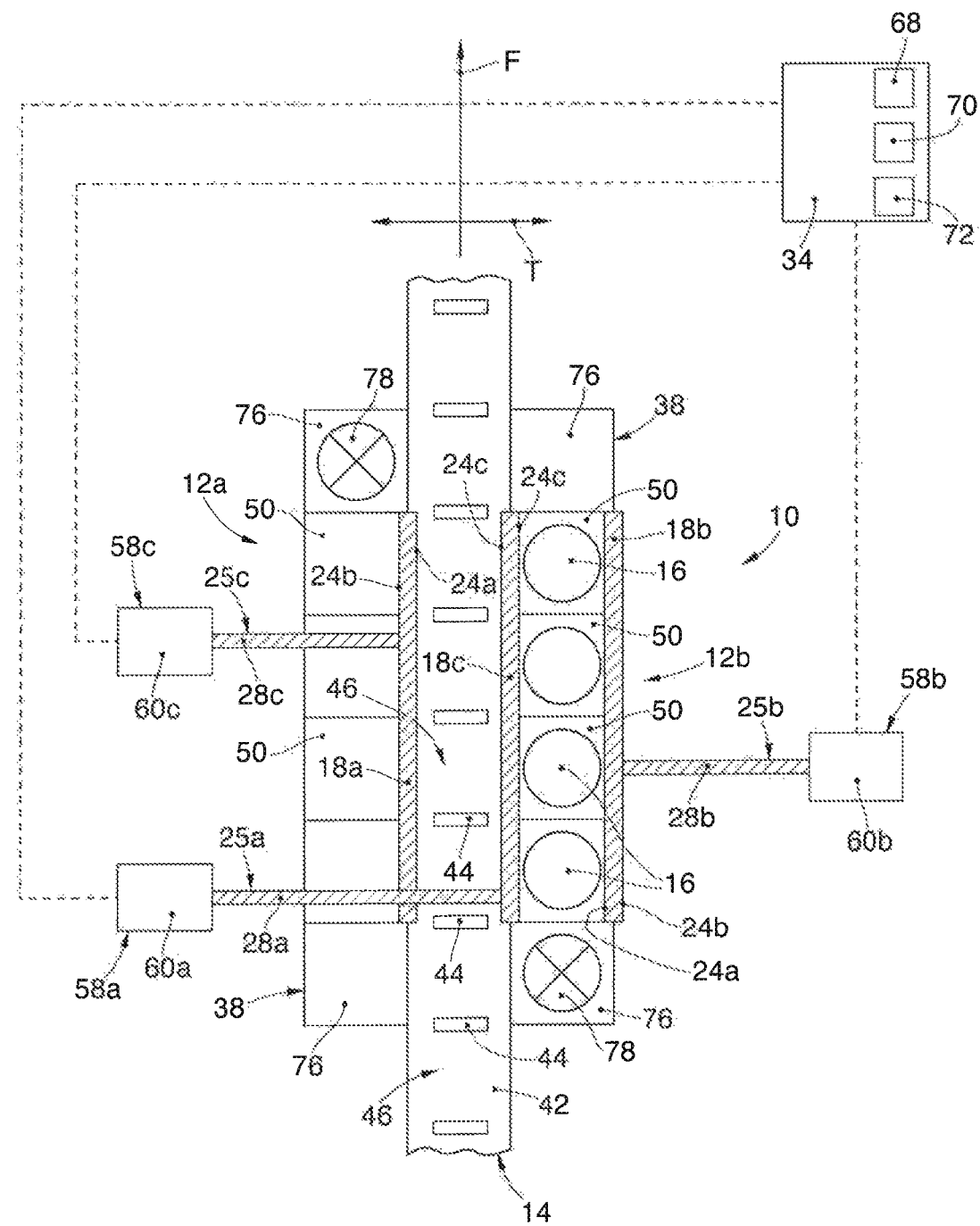
FIG. 9 is a schematic top view of a transferring device according to further embodiments described herein.

According to possible embodiment variants shown in FIGS. 7 to 9, embodiments of the transferring device 10 may include:
- a first external transferring arm 25a, provided with a supporting rod 28a and a gripping edge 18a provided with at least one internal contact surface 24a;
- a second external transferring arm 25b, provided with a supporting rod 28b and a gripping edge 18b provided at least with one internal contact surface 24a; and
- an intermediate transferring arm 25c provided with a supporting rod 28c and a gripping edge 18c provided with two contact surfaces 24c.

Embodiments of the transferring device 10 shown in FIGS. 7 to 9, and combinable with all of the embodiments described herein, may include:
a control unit 34 to control the alignment along the advancing direction F of containers 16 in a transferring zone of the container advancing device 14 at the operating unit to be served, the translation of the containers 16, along the transferring direction T, from and toward the operating unit/units by the coordinated driving of the transferring arms 25a, 25b, 25c.

The "transferring zone" is defined as the zone where the containers 16 can be transferred by the transferring device 10 from the container advancing device 14 to and from the operating unit/units.

Embodiments described herein also relate to a method for transferring, by transferring device 10, containers 16 from a container advancing device 14, where they are aligned in at least one row along an advancing direction F, to at least one operating unit arranged outside the line.

The method according to the present description provides for advancing containers 16 from a container advancing device 14, where they are aligned in at least one row along an advancing direction F, to at least one operating unit arranged outside the line, adjacent to the container advancing device 14, along a transferring direction T transverse to the advancing direction F.

The method also provides for translating transferring arms 25, for example two transferring arms 25, that are movable along said transferring direction T from the container advancing device 14 toward the operating unit. The method also provides for selectively defining, by moving the transferring arms 25 toward and away from each other along the transferring direction T, an adjustable format gripping condition in which the transferring arms 25 are brought closer in contact on opposite sides with one or more containers 16 arranged along the advancing direction F for transferring them along the transferring direction T, and a releasing condition, in which the transferring arms 25 are spaced away from the containers 16.

In accordance with embodiments shown in FIGS. 10 to 15, an implementation of the method according to the variants providing for three transferring arms 25a, 25b, 25c, includes:

driving the first external transferring arm 25a wherein supporting rod 28a moves the gripping edge 18a including at least one internal contact surface 24a;

driving the second external transferring arm 25b wherein supporting rod 28b moves the gripping edge 18b including at least one the internal contact surface 24b;

driving the intermediate transferring arm 25c wherein supporting rod 28c, moves the gripping edge 18c including two contact surfaces 24c; and activating the translation, along the transferring direction T, from and toward the weighing unit/units 12 of the containers 16 by transferring arms 25a, 25b, 25c, operating in coordination with each other and in coordination with the arrival along the advancing direction F of the containers 16 in the transferring zone of the container advancing device 14.

In accordance with embodiments, combinable with all of the embodiments described herein, the transferring device 10 is positioned substantially above the container advancing device 14, which in turn may be nearly centered with respect to the weighing unit/units 12.

In possible embodiments, combinable with all of the embodiments described herein, at least one row of containers 16 is advanced by the container advancing device 14 along the advancing direction F. Examples of a container advancing device 14 usable in the embodiments described herein may be a conveying device, in particular a closed loop conveyor belt, a closed loop carpet conveyor belt, a supporting surface, or table, movable by means of a linear motor, a band or belt for conveying inside a filling line for filling pharmaceutical, medical or food containers (for convenience not illustrated in the figures). An actuating element for driving the container advancing device 14 may be provided. The actuating element may include a driving unit to move the containers 16, which is operated by an energy source, for example an electric current, a hydraulic fluid pressure or a pneumatic pressure. A driving unit as used in association with the embodiments described herein may be an electric motor, a stepping electric motor, a magnetic motor, a linear axis with a motor, a linear motor, such as a mechanical linear motor, a piezoelectric linear motor, an electromagnetic linear motor, an electromechanical motor, an electromagnet, or a gear motor, in particular a direct current gear motor. For example, motors may be provided that use the electromagnetism and the magnetic fields for the interaction between a first part including electric windings and a second part including other electric windings, or of permanent or energized magnets or of a conductor. In specific possible embodiments, the driving unit may be linear motor, for example an induction linear motor, a synchronous linear motor, a brushless synchronous linear motor, a homopolar linear motor, a voice coil linear motor, a tubular linear motor, or even, as stated, a piezoelectric linear motor or an electromagnet. The actuating element may be operated to cause advancing and stop steps of the container advancing device 14. For example, a stop step may be provided for transferring the containers 16 from the container advancing device 14 to the weighing unit/units 12.

It is contemplated that the container advancing device 14 may also be operated in the direction opposite to the advancing direction F.

According to embodiment variations, combinable with all of the embodiments described herein, the container advancing device 14 includes a closed loop conveyor belt 42, wound around a driving pulley, which is not shown in the figures for convenience of illustration. Advantageously, the upper region of the conveyor belt 42 defines a nearly flat surface for stably conveying the containers 16 along the advancing direction F.

According to embodiments, the conveyor belt 42 may include singularizing elements 44 for aligning and singularizing the containers 16 along the path of the container advancing device 14 and to supply the containers 16 in a substantially equispaced manner in the transferring zone.

The singularizing elements 44 may be independent components or may even be integrated in the conveyor belt 42, and cooperate with the latter.

According to the embodiments described herein, the singularizing elements 44 may be defined by plates fixed on the external surface of the conveyor belt 42, reciprocally spaced away by a uniform step, assessed relatively to the possible dimensions of the containers 16 that are processed.

According to embodiment variants, the singularizing elements 44 may be defined by walls, partitions, balancing elements or similar and comparable elements.

According to the embodiments described herein, the singularizing elements 44 define on the conveyor belt 42 housing seats 46 in each of which a container 16 to be processed or to be shifted toward the weighing unit/units 12 is placed.

In possible further embodiments shown in FIGS. 1, 2, 5 and 6, combinable with all of the embodiments described herein, the container weighing unit 12 may include a container support 50 and a sensor unit 36 for detecting a weight force acting on the container support 50.

Container supports 50 are preferably defined as a flat upper surface, which usually comes into contact with the lower surface of the containers 16 during the weighing steps. The container supports 50 are configured to temporarily and stably sustain the containers 16 at least for the time duration necessary for weighing. They may advantageously have a regular and symmetrical geometrical shape, for example circular, square or three-lobed.

For example, and without limiting any of the embodiments, a container support 50 of the type used in the embodiments described herein may be a flat plate, a supporting dish, a disk, a portion of the container advancing device, a container-holder, a pedestal or other support suitable for supporting the container 16.

In some embodiments given by way of non-limiting example, the sensor unit 36 may include one or more sensors for detecting the weight force and be connected to the control unit 34 which receives a weight signal detected from each sensor unit 36.

Control unit 34 processes, via software, the received signal, also as a function of the expected measurement error.

It should be noted here that one or more of the sensors included in the sensor unit 36 as used in the embodiments described herein may be a force sensor or transducer, as a load cell, for example a load cell with strain gauge, a hydraulic or hydrostatic load cell, a piezoelectric load cell, a vibrating wire load cell and a capacitive load cell; a pressure sensor or transducer, for example of the electronic type generally used for collecting a force for measuring deformation or deviation caused by the force applied above an area, such as a sensor with a piezo-resistive strain gauge, a capacitive sensor, an electromagnetic sensor, a piezoelectric sensor, an optical sensor or a potentiometric sensor.

It should be understood that, based on the specific position of the sensor unit 36, the sensor unit may also include at least one pressure sensor and at least one force sensor, for example a load cell.

According to several implementations of the embodiments described herein, the weight force on the container support 50 may be detected by one or more load cells, one or more pressure sensors or one or more other sensors, which use a strain gauge, a piezoelectric element, a piezo-resistive element, a Hall effect element, or the like. With that, it should be considered that a pressure is the force exerted per unit surface area, so that depending on whether one or more sensors are provided as pressure sensors or as force sensors or load cells, it might be necessary to consider a conversion.

In accordance with possible implementations, the sensor unit 36 is independent of what applies the pressure or force, for example, the sensor does not activate, move or affect the container 16, the container support 50, or any other part or portion of the apparatus.

According to embodiments described herein, one or at least two weighing units 12 may be provided, appropriately in the case of two weighing units 12a, 12b, they are positioned symmetrically with respect to the container advancing device 14.

In possible implementations, a weighing unit 12 usable in the embodiments described herein includes one or more weighing devices 38 each of which is provided for the weighing control for a specific container 16.

Each weighing device 38 includes the mentioned container support 50, a sustaining stem 52 suitable for sustaining the container support 50 and the mentioned sensor unit 36. Preferentially, the sustaining stem 52 related to the corresponding container support 50 is arranged below and corresponds to the vertical passing through the barycenter of the related container support 50. It may be provided that the sensor unit 36 is dedicated for each weighing device 38, or that it is shared between coordinated pairs of weighing devices 38, for example arranged aligned on opposite sides of the container advancing device 14, transverse to the advancing direction F (see, for example, FIGS. 6 and 7). Therefore, the sensor unit 36 serves both a weighing device 38 of a weighing unit 12a on one side of the container advancing device 14 and a homologous and aligned other weighing device 38 of the other weighing unit 12b arranged on the opposite side, but taking into account that during a weighing step, either one container support 50 or the other container support 50 related to the same sensor unit 36 may be occupied. Therefore, two weighing devices 38 may be connected to a same single sensor unit 36, as shown in FIGS. 6 and 7.

On the contrary, within a same weighing unit 12, each weighing device 38 is served by its own sensor unit 36, that is to say, the sensor unit 36 is not shared between weighing devices 38 belonging to the same weighing unit 12.

For example, in the embodiments in which there are two weighing devices 38 belonging one to one weighing unit 12a and one to the other weighing unit 12b, arranged aligned on opposite sides of the container advancing device 14, transverse to the advancing direction F, a supporting element 40 is provided, which is arranged transverse to the advancing direction F of the container advancing device 14, which supports the sustaining stems 52 and the container supports 50 (see, for example, FIGS. 6 and 7).

The supporting element 40 has an axis of symmetry M and the respective sustaining stems 52 and container supports 50 are provided in symmetrical position with respect to that axis of symmetry M. That axis of symmetry M may be preferably provided at the longitudinal center line of the container advancing device 14, that is to say, at the advancing direction F.

As shown in FIGS. 5 and 6, each weighing unit 12a, 12b may therefore be provided with respective rows of weighing devices 38. Therefore, overall there are opposite rows of weighing devices 38, on opposite sides of the container advancing device 14.

Therefore, the optimum spacing step for the containers 16 on the conveyor belt 42 may be defined as the distance intervening between the vertical axes of two sustaining stems 52 that are adjacent to one another, belonging to the same weighing unit 12, or also as the distance intervening between the barycenter of two adjacent container supports 50, again belonging to the same weighing unit 12.

According to the embodiments shown in FIGS. 7 to 9, the weighing units each 12a, 12b include, for the weighing steps, six container supports 50. However, in accordance with embodiments of the present invention the number of container supports 50 may be higher or lower than six for carrying out the weighing steps.

According to the embodiments described herein, the container advancing device 14 is configured for stepping advancing, for example, the advancing step may be equal to four housing seats 46, since the weighing units 12a, 12b each provide four container supports 50 available for the weighing steps.

According to the embodiments shown in FIGS. 7 to 9, the weighing units 12a, 12b provide four container supports 50 available for weighing instead of six, since, for example, two external container supports 76 may be assigned to substantially permanently house several sample containers 78 (shown only in FIG. 9).

However, there is no reason why all of the container supports 50 and the related weighing devices 38 present in the weighing units 12a, 12b cannot be available and used for the steps of weighing the containers 16 arriving from the container advancing device 14, without disposing and providing external container supports 76 assigned to house sample containers 78.

Preferably, if sample containers 78 are provided that occupy some external container supports 76, the container supports 50 intended and available for the steps of weighing the containers 16 arriving from the container advancing device 14, are for example the central ones in both the weighing units 12a, 12b, possibly leaving the external container supports 76 free to house sample containers 78. The sample containers 78 arranged on the external supports 76 may be two in number and may be arranged in any combination of positions, but there is no reason why the sample containers 78 are in a number higher or lower than two and arranged arbitrarily.

As previously set forth, the conveyor belt 42 of the container advancing device 14, loaded with containers 16 to be weighed, advances with a certain step. In the case in which the weighing units 12a, 12b have for example four container supports 50 on each side, of respective supporting elements 40, available for receiving the containers 16 carried by the container advancing device 14 in a transferring zone for being weighed, the step may be constant and equal to the length of four housing seats 46.

The plane containing the upper surface of the conveyor belt 42 and the plane containing the upper surface of the container supports 50 are preferably parallel to each other, the latter being possibly slightly lower or higher than the former. In that event, the operation of the transferring device 10 should allow a first movement of the containers 16 that is performed along the transferring direction T, and a second movement in a direction that is orthogonal to this downward or upward, to allow the lower surface of the containers 16 to contact the upper surface of the container supports 50, minimising any vibrations of the containers 16 and so stably positioning them.

However, advantageously, the plane containing the upper surface of the conveyor belt 42 and the plane containing the upper surface of the container supports 50 substantially coincide to allow a mere translation by dragging and sliding of the containers 16 on them, which translation is performed by the transferring device 10 along the transferring direction T.

Since the container supports 50 perform practically no vertical moving, that is to say, they are not noticeably lowered at the moment in which they receive the containers 16, other than some hundredths of a millimeter, an arrangement of this kind that allows that a movement for lowering the containers 16 by the transferring device 10 need not to be performed.

In possible implementations as shown for example in FIG. 9, one or more actuating elements 58a, 58b, 58c may be provided for driving the translation of the above-mentioned transferring arms 25a, 25b, 25c and consequently moving the related gripping edges 18a, 18b, 18c.

According to embodiment variations a single actuating element suitable for driving all three transferring arms 25a, 25b, 25c in a coordinated way, or a dedicated actuating element for each transferring arm 25a, 25b, 25c may be provided. Therefore, in embodiments, for example three actuating elements 58a, 58b, 58c for the corresponding arms 25a, 25b, 25c may be provided.

An actuating element as used in the embodiments described herein, both in the case of a single actuating element 58 and in the case of three dedicated actuating elements 58a, 58b, 58c, may include a related driving unit 60a, 60b, 60c for moving the respective transferring arms 25a, 25b, 25c along the transferring direction T as shown for example in FIG. 9.

According to possible embodiments, a driving unit 60a, 60b, 60c is operated by an energy source, for example an electric current, a hydraulic fluid pressure or a pneumatic pressure. Each actuating element 58a, 58b, 58c may include a driving unit 60a, 60b, 60c such as an electric motor, a pneumatic motor, a hydraulic piston, or a piezoelectric actuator. Usually, an actuating element, as used in association with embodiments described herein, may be an intrinsically linear movement actuator or it may be configured to convert a circular movement into a linear movement. The conversion may usually be performed by screw actuators, such as a screw jack, ball screw and roller screw actuators, or wheel and axle, for example drum, gear, pulley or shaft, actuators, such as a lifting cable, a winch, a rack and a pinion unit, a chain drive, a belt drive, rigid chain and rigid belt actuators.

According to various embodiments, each driving unit 60a, 60b, 60c may cause the desired linear moving of the transferring arm 25a, 25b, 25c and therefore of the associated gripping edge 18a, 18b, 18c.

According to various embodiments, each driving unit 60a, 60b, 60c may supply a translation movement, whose direction may be inverted.

According to a possible embodiment variation shown in FIGS. 7 and 8, the transferring arms 25a, 25b, 25c may be supported and guided by dedicated supporting devices 62a, 62b, 62c.

The transferring arms 25a, 25b, 25c may be mounted cantilevered on the corresponding supporting devices 62a, 62b, 62c by fixing the supporting rods 28a, 28b, 28c to brackets 63 by fixing elements. In turn, the brackets 63 pivot on pins 65 at levers 64 at a first end 67 thereof. At a second end 69, the levers 64 pivot, at pins 65 that allow their rotation, also at a supporting frame 66 which acts as a support. The rotation of the levers 64 with respect to the corresponding supporting frames 66 of the supporting devices 62a, 62b, 62c allows translation of the transferring arms 25a, 25b, 25c in the desired transferring direction T.

The structure that is formed by the mutual arrangement of the transferring arms 25a, 25b, 25c, of the levers 64 and of the supporting frames 66 defines a substantially parallelogram shape and allows, by activation of the driving units 60a, 60b, 60c, the movement along the transferring direction T.

According to the present description, the control unit 34 is advantageously configured to act on the driving units 60a, 60b, 60c of the transferring device 10, inverting their direction, thereby affecting the advancing direction of the supporting rods 28a, 28b, 28c and consequently of the gripping edges 18a, 18b, 18c.

In particular, according to embodiments described herein, the axes of movement of the supporting rods 28a, 28b, 28c are substantially parallel to each other and also parallel to the mentioned transferring direction T.

Advantageously, the gripping edges 18a, 18b, 18c are arranged at the terminal end of the respective supporting rod 28a, 28b, 28c, arranged parallel to each other and parallel to the advancing direction F, so as to suitably receive the containers 16 inside them.

The gripping edges 18a, 18b, 18c substantially have the same shape and size, although it is not excluded that they may be made in formats that are different to one another.

According to possible embodiments, the gripping edges 18a, 18b, 18c are made in the shape of plates, with at least the internal contact surfaces 24a and the contact surfaces 24c parallel to each other. In possible implementations, the external surfaces 24b may not be parallel to the above-mentioned internal contact surfaces 24a and to the contact surfaces 24c.

Appropriately, at least the internal contact surfaces 24a and the contact surfaces 24c are substantially parallel to each other, particularly at least when they come into contact with the containers 16 to be weighed.

According to possible embodiments, the gripping edges 18a, 18b, 18c translate over the upper surface of the conveyor belt 42, and possibly they are raised above it by a height at least equal to that of the singularizing elements 44 present on the conveyor belt 42, so as to not come into contact with the latter during the steps of moving the containers 16 to and from the weighing units 12a, 12b.

According to further embodiment variations, in order to achieve a more effective grip on the containers 16 to be moved, it is preferable that the gripping edges 18a, 18b, 18c have their lower surface almost in contact with the conveyor belt 42 of the container advancing device 14. In that embodiment, it is appropriate that notches 74 are made in the lower part of the gripping edge 18a, 18b, 18c with a cross-section at least equal to the lateral section of the singularizing elements 44, so that they pass through and do not come into contact with the gripping edges 18a, 18b, 18c during the steps of moving the containers 16 to and from the weighing units 12 (FIG. 8).

Advantageously, either at least the internal contact surfaces 24a and/or at least the contact surfaces 24c, or at least one internal contact surface 24a and one contact surface 24c not cooperating with the latter, which come into contact with the containers 16 during the moving steps, may be knurled or coated with an anti-slip material.

The gripping edges 18a, 18b, 18c may be made of metal, metal alloy, plastics, rubber, polymeric materials, or any combination of the above-mentioned materials, or any other material that is similar and suitable for the objects of the present invention.

FIGS. 10 to 15 illustrate in sequence the operation of the transferring device 10 according to a moving method according to the present description, meaning that it is described in operation, that is to say, with the conveyor belt 42 of the container advancing device 14 driven normally so as to advance the containers 16 along the advancing direction F.

Moreover, according to the present embodiments, the flow of containers 16 occurs "without gaps", that is to say, the containers 16 are arranged on the conveyor belt 42 so that a container 16 is always present between a housing seat 46 and a contiguous one. Therefore, there are no empty housing seats 46, for example between one housing seat 46 and the next, except possibly in the transferring zone, during the steps of transferring and weighing the containers 16. However, the present transferring device 10 and the related moving method associated with it operate correctly even in the hypothesis that there are some housing seats 46 possibly not occupied by containers 16.

It shall be understood that between one illustration and the next in FIGS. 10 to 15, either a step of translating containers 16 by the gripping edges 18a, 18b, 18c or a step of advancing of the conveyor belt 42, stepping advancing, by a step equal the length of four housing seats 46 is provided. It is also specified that, for the illustration in FIG. 10, a step of advancing of the conveyor belt 42 has already been performed to bring into the transferring zone some first containers 16 to be transferred toward an operating unit according to the moving method of the transferring device 10.

Figure 10:
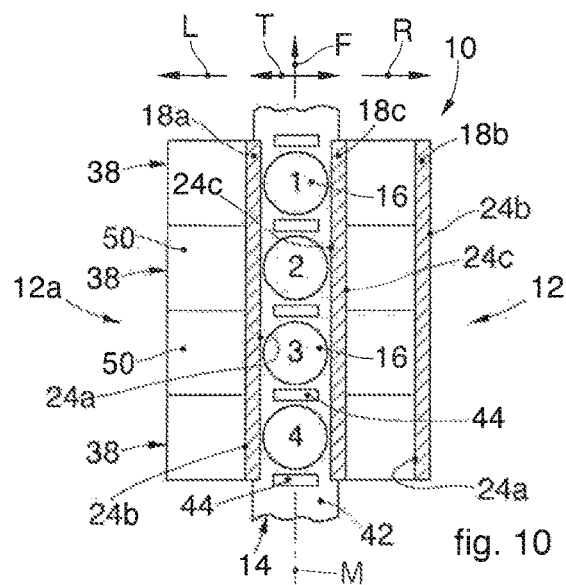
FIGS. 10 to 15 are schematic top views, respectively, of a transferring device according to further embodiments described herein.

In particular, during operation, four containers 16 are advanced on the surface of the conveyor belt 42, arranged without empty spaces, one for each housing seat 46 along the advancing direction F, until they reach a stop position that is provided at the available container supports 50 for weighing, in the transferring zone as shown in FIG. 10.

In this description of the operation of the transferring device 10, the first moving step takes place with a direction of translation toward the "left" L along the transferring direction T. There is no reason why, as it will be clearer below, the operation may initially occur with the edges arranged in another suitable way, for example symmetrically with respect to the axis of symmetry M of the container advancing device 14, with a direction of translation toward the "right" R along the transferring direction T, the operation being of a cyclical nature.

The reference "left" and "right", which will be used below, is that taken from the viewpoint of an observer looking along the advancing direction and direction F of the container advancing device 14, and that in any case will be clear in association with FIGS. 10 to 15.

As described with reference for example to FIG. 10, before the entry of the first four containers 16, the gripping edge 18a is appropriately arranged to the left of the conveyor belt 42, while the gripping edge 18c and the gripping edge 18b are appropriately arranged to the right of the conveyor belt 42. Between the internal contact surface 24a of the gripping edge 18a and the contact surface 24c of the gripping edge 18c there is an opening, at the minimum distance point, at least equal to the largest size of width W of a container 16.

When the first four containers 16 have entered the transferring zone and the conveyor belt 42 has stopped, the first containers 16 are arranged between the gripping edge 18a and the gripping edge 18c, as shown in FIG. 10.

Figure 11:
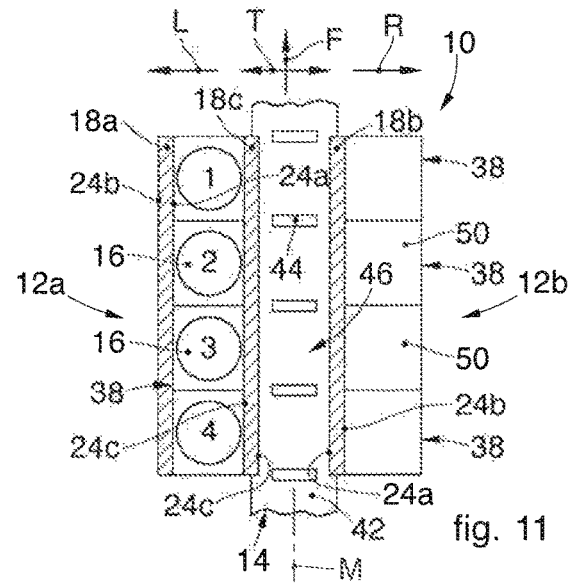

At this point, the transferring arms 25a, 25c are driven for moving the gripping edges 18a, 18c and more precisely for bringing the internal contact surface 24a of the gripping edge 18a and the contact surface 24c of the gripping edge 18c to rest against the first containers 16 arranged between them. Due to the movement of the gripping edges 18a, 18c toward each other, the containers 16 are securely gripped and the translation of the containers 16 along the transferring direction T in the direction of translation toward the left L can begin. When the gripping edges 18a, 18c have arrived in suitable position, namely on the container supports 50 of the weighing unit 12a as shown in FIG. 11, a step may begin of opening of the gripping edges 18a, 18c by a measurement suitable for releasing the containers 16 substantially stably resting with their lower surface on the upper surface of the container supports 50 and allowing the respective weighing devices 38 to detect their weight. In conjunction with, but preferably simultaneously with this movement, driving of the transferring arm 25b may also occur for moving the gripping edge 18b along the transferring direction T in the direction of translation toward the left L. When the internal contact surface 24a of the gripping edge 18b has arrived at a position such that it does not interfere with possible containers 16 entering the transferring zone, then it is possible to stop the transferring arm 25b and consequently the gripping edge 18b, leaving the transferring device 10 in a step of temporarily waiting for a further insertion of four containers 16 by the stepping drive of the conveyor belt 42.

Figure 12:
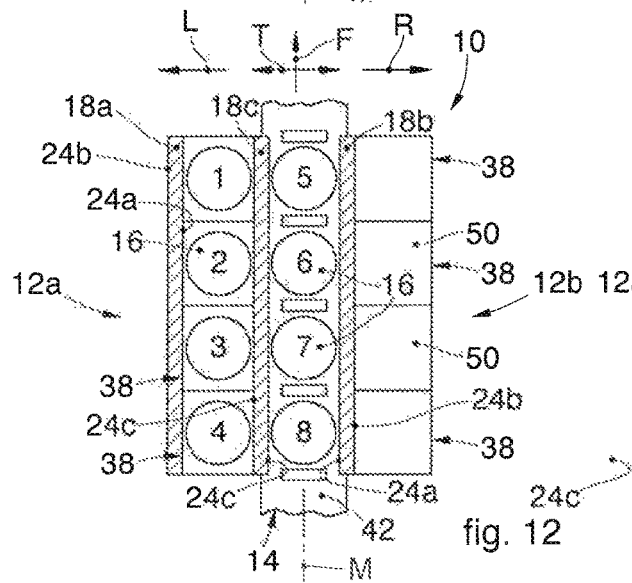

When the second four containers 16 have entered the transferring zone and the conveyor belt 42 has stopped, the second containers 16 are arranged between the gripping edge 18c and the gripping edge 18b, as shown in FIG. 12.

Figure 13:
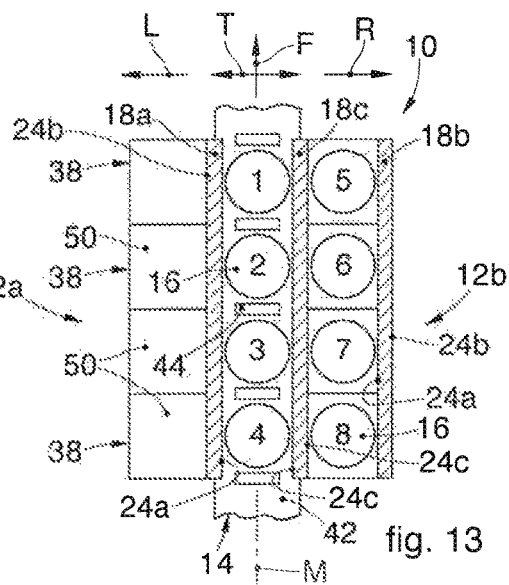

At this point, having completed the weighing step, the transferring arms 25a, 25b, 25c are driven to move the gripping edges 18a, 18b, 18c and more precisely for bringing the internal contact surface 24a of the gripping edge 18a and the contact surface 24c of the gripping edge 18c to rest against the first containers 16 arranged between them, and subsequently holding the first containers securely gripped between the gripping edges 18a, 18c and providing a united moving thereof for bringing the internal contact surface 24a of the gripping edge 18b and the contact surface 24c of the gripping edge 18c into contact with the second containers 16 arranged between them, which have entered the transferring zone. Due to the movement of the gripping edges 18a, 18c toward each other, the first containers 16 are securely gripped and then due to the movement of the gripping edges 18c, 18b toward each other, also the second containers 16 are securely gripped. Therefore, the translation of the first and second containers 16 along the transferring direction T in the direction of translation toward the right R can begin, with this action disengaging the container supports 50 of the weighing unit 12a. When the gripping edges 18c, 18b have brought the second containers 16 into a suitable position, namely on the container supports 50 of the weighing unit 12b (as shown in FIG. 13), it is possible to begin opening the gripping edges 18c, 18b, and move gripping edge 18a united with that of the gripping edge 18c, by a suitable measurement for releasing the second containers 16 substantially stably resting with their lower surface on the upper surface of the container supports 50 and allowing the respective weighing devices 38 to detect their weight. On the contrary, the gripping edges 18a, 18c will continue their movement along the transferring direction T in the direction of translation toward the left L for bringing the first containers 16 back to a suitable position, that is to say, in a positioned centered on the conveyor belt 42. When the first containers 16 have been brought back into position on the conveyor belt 42, it is possible to begin a step of opening the gripping edges 18a, 18c by a measurement suitable for releasing the first containers 16 substantially stably resting with their lower surface on the upper surface of the conveyor belt 42.

When the internal contact surface 24a of the gripping edge 18a and the contact surface 24c of the gripping edge 18c are no longer in stable contact with the first containers 16, then it is possible to stop the transferring arm 25a and the transferring arm 25c, leaving the transferring device 10 in a step of temporarily waiting for a further insertion of four containers 16 by the stepping driving of the conveyor belt 42.

Figure 14:
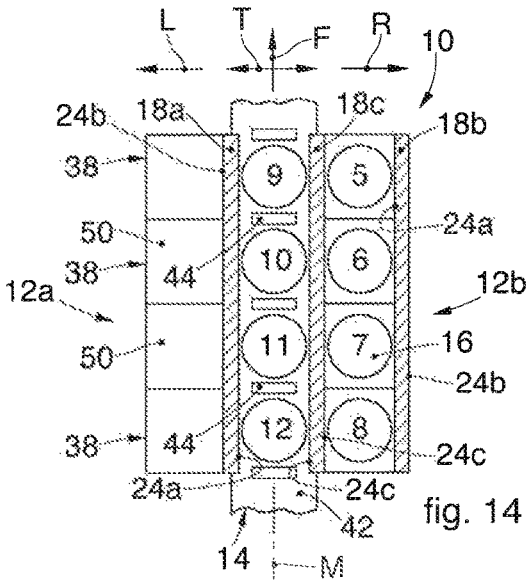

Subsequently, the conveyor belt 42 is activated, and the first containers 16 continue to advance along the conveyor belt 42 exiting the transferring zone, while their place is taken by third four containers 16, as shown in FIG. 14.

When the third four containers 16 have entered the transferring zone and the conveyor belt 42 has stopped, the third containers 16 are arranged between the gripping edge 18a and the gripping edge 18c, as shown in FIG. 14.

According to the embodiment shown in FIGS. 14 and 15, the steps of translation of the containers 16 are symmetrical, with respect to the axis of symmetry M of the container advancing device 14, to those described with reference to FIGS. 12 and 13.

Figure 15:
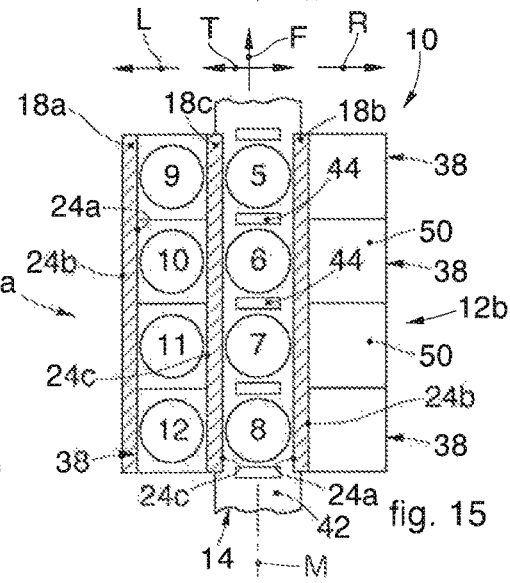

According to the embodiments shown in FIG. 15, when the internal contact surface 24a of the gripping edge 18b and the contact surface 24c of the gripping edge 18c are no longer in stable contact with the second containers 16, then it is possible to stop the transferring arm 25b and the transferring arm 25c, leaving the transferring device 10 in a step of temporarily waiting for a further insertion of four containers 16 by the stepping driving of the conveyor belt 42, substantially causing the end of a complete operating cycle of the transferring device 10, which may conceptually restart from FIG. 12 and be repeated as many times as necessary.

It is clear from the above explanation of operation of the transferring device 10, to a person skilled in the art, that containers 16 having different shape and dimensions can advantageously be moved by adapting by software the stroke of the actuating elements 58a, 58b, 58c which act respectively on the supporting rods 28a, 28b, 28c.

Another way of integrating the transferring device 10, for overcoming the drawback of the format change for the containers 16, could also be achieved by simply replacing, and therefore varying the length of the supporting rods 28a, 28b, 28c and/or the thickness of the gripping edges 18a, 18b, 18c or by a combination of variation of the dimensions of these moving elements.

The transferring device 10 and its related operating method also allow a 100%-type weighing, that is to say, weighing of all of the containers 16 fed along the container advancing device 14, or even a statistical-type weighing, that is to say, weighing of only some batches of containers 16. The execution of one type of weighing rather than the other is always achievable by means of different time settings imparted by the control unit 34 to the transferring device 10.

The control unit 34 may include a central processing unit 68, or CPU, an electronic memory 70, an electronic database 72 and auxiliary circuits or I/O (not illustrated).

For example, the CPU may be any form of computer processor usable in the information technology and/or automation field. The memory may be connected to the CPU and may be one or more of those commercially available, such as a random access memory (RAM), a read only memory (ROM), floppy disk, hard disk, mass storage, or any other form of digital, local or remote storage. The software instructions and the data may, for example, be coded and stored in the memory for controlling the CPU. Also the auxiliary circuits may be connected to the CPU for helping the processor in the conventional way. The auxiliary circuits may include, for example, at least one among: cache circuits, power circuits, clock circuits, input/output circuitry, subsystems, and the like. A program (or computer instructions) that can be read by a computer can determine which tasks can be performed in accordance with a translating arm moving method for containers 16, according to the present description. In some embodiments, the program is software that can be read by the computer. The computer includes code for generating and storing information and data entered or generated during the method according to the present description.

The extent of the time resulting from the movement of the containers 16 and from the weighing is of fundamental importance for determining the waiting time of the conveyor belt 42 between one stepping driving and the next. In fact, advantageously, the shorter the waiting time of the conveyor belt 42 is, the more the entire machine gains in productivity. Moreover, the better the transferring conditions are for the containers 16, that is to say, the fewer vibrations that are transferred by the transferring device 10 to the containers 16, the faster the weighing step can occur.

Preferably, the control unit 34 may be configured to impart constant or variable speeds and/or accelerations to the actuating elements 58a, 58b, 58c and consequently to the supporting rods 28a, 28b, 28c and to the gripping edges 18a, 18b, 18c for fitting to the various moving steps of the containers 16.

Embodiments may provide for executing various steps, passages and operations as described above. Those steps, passages and operations may be performed with instructions run by a machine, which cause certain steps to be performed by a general-purpose or special-purpose processor. Alternatively, those steps, passages and operations may be performed by specific hardware components that contain hardware logic for performing the steps, or by any combination of components for programmed computers and customised hardware components.

Embodiments of the method according to the present description may be included in a computer program which can be stored in a computer-readable medium containing the instructions that, once performed by the transferring device 10, cause the method, about which it is discussed, to be performed.

In particular, elements according to the present invention may be supplied as media that can be read by a machine for storing the instructions that can be performed by the machine. The media that can be read by a machine may include, without being limited to, floppy disks, optical disks, CD-ROMs and magnetic-optical disks, ROM, RAM, EPROM, EEPROM, optical or magnetic boards, propagating means or other types of media that can be read by a machine and are suitable for storing electronic data. For example, the present invention may be downloaded as a computer program which can be transferred from a remote computer (for example, a server) to a computer that makes a request (for example, client), by means of data signals produced with wave carriers or other propagating devices, via a communication connection (for example, a modem or a network connection).

It is clear that changes and/or additions of parts can be made to the transferring device 10 described above, without thereby departing from the scope of the present invention.

It is also clear that, although the present invention has been described with reference to some specific examples, a person skilled in the art will certainly be able to make many other equivalent forms of the above-mentioned device and therefore all falling within the scope of protection defined by them.

Although what has been described above refers to embodiments of the invention, other and further embodiments may be provided without thereby departing from the main scope of protection thereof.

The invention claimed is:

1. A transferring device for transferring containers from a container advancing device, the containers being aligned in at least one row along an advancing direction, to at least one operating unit arranged outside the line, adjacent to the container advancing device, along a transferring direction transverse to said advancing direction, comprising a plurality of movable transferring arms, for selectively translating along said transferring direction from the container advancing device toward said operating unit, said transferring arms being movable toward and away from each other along said transferring direction between an adjustable gripping condition in which said transferring arms are brought closer to each other and in contact, on opposite sides, with one or more containers arranged along said advancing direction for transferring said one or more containers along said transferring direction, and a releasing condition in which said transferring arms are spaced from said one or more containers, wherein said transferring device comprises first and second external transferring arms and an intermediate transferring arm cooperating with two operating units that are arranged on opposite sides with respect to said container advancing device, wherein said first and second external transferring arms each include an internal contact surface for gripping said one or more containers and an external surface, said intermediate transferring arm including first and second contact surfaces for gripping said one or more containers, the internal contact surfaces of the first and second external transferring arms face one another, the distance between the first external transferring arm internal contact surface and the intermediate transferring arm first contact surface defines a first container gripping zone, and the distance between the second external transferring arm internal contact surface and the intermediate transferring arm second contact surface defines a second container gripping zone.

2. The device according to claim 1, wherein in said adjustable gripping condition, at least one container gripping zone is defined between said transferring arms, said gripping zone having a width that is adjustable so as to be equal to a larger transverse size of said one or more containers.

3. The device according to claim 1, wherein said first external transferring arm includes a supporting rod and a gripping edge comprising at least one internal contact surface, said second external transferring arm including a supporting rod and a gripping edge comprising at least one internal contact surface, and said intermediate transferring arm including a supporting rod and a gripping edge including first and second contact surfaces.

4. The device according to claim 3, and further comprising supporting devices, said supporting devices including supporting frames, brackets, levers and pins, said first external transferring arm, said second external transferring arm and said intermediate transferring arm being cantilever mounted on corresponding supporting devices by connecting respective supporting rods with said brackets of said corresponding supporting devices.

5. The device according to claim 4, wherein said first and second external transferring arms and said intermediate transferring arm, said levers and said frames define a parallelogram configuration enabling said first and second external transferring arms and said intermediate transferring arm to be moved along said transferring direction.

6. The device according to claim 1, and further comprising a control unit, for controlling the alignment of said one or more containers along said advancing direction, the alignment of said one or more containers with at least one operating unit, and the translation of said one or more containers along a transferring direction by said external and intermediate transferring arms.

7. A weighing station of a filling line for filling containers, said weighing station comprising one or more weighing units and a transferring device according to claim 1.

8. A filling line for filling containers, said filling line comprising a filling station, a weighing station according to claim 7 and a container closing station.

9. A method for transferring containers aligned in at least one row along an advancing direction between a container advancing device and at least one operating unit arranged adjacent to the container advancing device along a transferring direction transverse to the advancing direction, comprising the steps of (a) translating transferring arms that are movable along the transferring direction from the container advancing device toward the operating unit; and (b) selectively defining an adjustable gripping condition and a releasing condition by moving said transferring arms toward and away from each other, respectively, along said transferring direction, said transferring arms being brought closer in contact, on opposite sides, with one or more containers arranged along said advancing direction for transferring said one or more containers along said transferring direction when in said adjustable gripping condition, said transferring arms being spaced away from said one or more containers when in said releasing condition, wherein said translating step comprises translating two external transferring arms and one intermediate transferring arm arranged between said external transferring arms for defining said gripping and releasing conditions, each of said external transferring arms gripping one or more containers with a respective internal contact surface and said intermediate transferring arm gripping one or more containers with two respective contact surfaces.

10. A method as defined in claim 9, wherein said translating step comprises: transferring containers using a first external transferring arm of said two external transferring arms with a respective internal contact surface and said intermediate transferring arm with a first of said contact surfaces and transferring containers using a second external transferring arm of said two external transferring arms with said respective internal contact surface and said intermediate transferring arm with a second of said contact surfaces, the distance between respective and reciprocally facing internal contact surfaces and intermediate transferring arm contact surfaces defining two container gripping zones.

11. Computer program that can be stored in a computer-readable medium, containing instructions that enabling a transferring device to perform the method according to claim 9.

* * * * *